United States Patent
Tabota

(10) Patent No.: US 6,360,603 B1
(45) Date of Patent: Mar. 26, 2002

(54) ACCELERATION SENSOR AND ACCELERATION DETECTING DEVICE

(75) Inventor: Jun Tabota, Toyama-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/411,022

(22) Filed: Oct. 4, 1999

(30) Foreign Application Priority Data

Oct. 19, 1998 (JP) .......................................... 10-297146

(51) Int. Cl.[7] .............................................. G01P 15/09
(52) U.S. Cl. .................................................. 73/514.34
(58) Field of Search ........................ 73/514.34, 514.16, 73/514.35, 514.36; 310/329, 331, 332

(56) References Cited

U.S. PATENT DOCUMENTS

| | | | | |
|---|---|---|---|---|
| 5,490,422 A | * | 2/1996 | Tabota et al. ............ | 73/514.34 |
| 5,515,725 A | * | 5/1996 | Tabota et al. ............ | 73/514.34 |
| 5,677,487 A | * | 10/1997 | Hansen ................... | 73/514.34 |
| 5,824,904 A | * | 10/1998 | Kouhei et al. ........... | 73/514.34 |
| 5,834,650 A | * | 11/1998 | Kim ........................ | 73/651 |
| 6,050,144 A | * | 4/2000 | Otsuchi et al. .......... | 73/514.34 |
| 6,098,460 A | * | 8/2000 | Otsuchi et al. .......... | 73/514.34 |

* cited by examiner

*Primary Examiner*—Richard A. Moller
(74) *Attorney, Agent, or Firm*—Ostrolenk, Faber, Gerb & Soffen, LLP

(57) ABSTRACT

An acceleration sensor 1 includes a strip-like piezoelectric member 2 having first and second end portions, first and second signal output electrodes 3, 4 formed on a pair of main surfaces facing each other of the piezoelectric member 2, and an intermediate electrode 5 formed at the intermediate position in the direction connecting a pair of main surfaces so as to face the first and second signal output electrodes 3, 4. The piezoelectric member is supported at both ends of the piezoelectric member by first and second supporting members. Polarization treatment is provided to the central area of the piezoelectric member in the thickness direction. The first and second signal output electrodes 3, 4 are led to a first end portion of the piezoelectric member 2, and the intermediate electrode 5 is led to a second end portion of the piezoelectric member.

15 Claims, 6 Drawing Sheets

ACCELERATION SENSOR AND ACCELERATION DETECTING DEVICE

BACKGROUND OF THE INVENTION

1. Field of the Invention

The present invention relates to an acceleration sensor and an acceleration detecting device. More particularly, the present invention relates to an acceleration sensor of the piezoelectric bimorph type and an acceleration detecting device using the acceleration sensor.

2. Description of the Related Art

Various acceleration sensors using bimorph type piezoelectric element are known. For example, in Japanese Unexamined Patent Publication No. 6-324073, an acceleration sensor 51, as shown in FIG. 5, is disclosed.

In the acceleration sensor 51, piezoelectric plates 52, 53 are used. The piezoelectric plates 52, 53 are of a rectangular shape, and the central portions 52a, 53a viewed from the longitudinal direction are polarized in opposite directions from each other in the thickness direction, as shown by the arrows.

Further, external areas 52b, 52c, shown by broken lines, are polarized, as shown by the arrows, in the thickness direction so as to be opposite to that of the central area 52a. Also in the piezoelectric plate 53, external areas 53b, 53c arranged on both sides of the central area 53a, and shown by broken lines are polarized, as shown by the arrows, in the thickness direction so as to be opposite to the central area 53a. Accordingly, the external area 52b and external area 53b, and the external area 52c and external area 53c facing each other are polarized in the thickness direction so as to be opposite to each other, respectively.

On each of the external main surfaces of the piezoelectric plates 52, 53, signal output electrodes 54, 55 are formed respectively. Further, at the portion where the piezoelectric plate 52 and piezoelectric plate 53 facing each other are joined and connected an intermediate electrode 56 is formed. However, the intermediate electrode 56 is formed so as not to extend to both ends of the piezoelectric plates 52, 53.

On the other hand, the signal output electrode 54 is led out to one end of the piezoelectric plate 52, and the signal output electrode 55 is led out to the end portion opposite to the side to which the signal output electrode 54 is led.

On the outsides of the piezoelectric plates 52, 53, supporting members 57, 58 are joined and connected respectively. The supporting members 57, 58 support the piezoelectric plates 52, 53 in the vicinity of both ends of the plates.

Further, on one end surface of the piezoelectric plates 52, 53 and the supporting members 57, 58, an external electrode 59 is formed, and the external electrode 59 is electrically connected to the signal output electrode 55. In the same way, also on the end surface opposite to the side with the external electrode 59, an external electrode (not illustrated) is formed, and this external electrode is electrically connected to the signal output electrode 54.

In the acceleration sensor 51, when acceleration acts in the direction of an arrow A, the piezoelectric plates 52, 53 are bent and the electric charge produced by the bending is output through the electrodes 54, 55, and accordingly the acceleration is able to be detected. As the acceleration sensor 51 is constructed in such a way that the piezoelectric plates 52, 53 are supported in the vicinity of both ends, the amount of electric charge to be generated at the time when acceleration acts is increased and, because of this, even if the acceleration sensor 51 is made of small size, it is said that the detection sensitivity is not likely to be lowered.

Although it is possible to make the acceleration sensor 51 small-sized and to improve the detection sensitivity, the capacitance between the electrodes is small and accordingly there is a problem that acceleration at low frequencies is difficult to be measured. This is explained in detail below.

When acceleration acts in the direction of the arrow A, the generated voltage and the capacitance between the signal output electrode 54 and the intermediate electrode 56, between the intermediate electrode 56 and signal output electrode 55, and between a pair of external electrodes are represented by $V_1$, $V_2$, $V_p$, $C_1$, $C_2$, and $C_p$ respectively as shown in Table 1.

TABLE 1

| Between electrodes | Generated voltage | Capacitance |
| --- | --- | --- |
| Signal output electrode 54-Intermediate electrode 56 | $V_1$ | $C_1$ |
| Intermediate electrode 56-Signal output electrode 55 | $V_2$ | $C_2$ |
| Between a pair of external electrodes | $V_p$ | $C_p$ |

Here, suppose the thickness, length, and width of the piezoelectric plates 52, 53 are the same, the relation of $V_1=V_2$ and $C_1=C_2$ results. Therefore, when $V_1$ and $V_2$ are respectively represented by $V_0$, and $C_1$ and $C_2$ are respectively represented by $C_0$, since the piezoelectric plates 52, 53 are connected in series, the generated voltage $V_p$ at the time when acceleration acts in the direction of the arrow A in the acceleration sensor 51 becomes $V_p=2\,V_0$, and the capacitance $C_p$ becomes $C_p=C_0/2$.

When acceleration is detected by using the above acceleration sensor 51, because the acceleration sensor 51 has a relatively high impedance, it is common to use a voltage amplifier or a charge amplifier. FIG. 6 is a circuit diagram showing an acceleration detection circuit having such a voltage amplifier connected.

In FIG. 6, a leak resistor R is connected in parallel to the acceleration sensor 51. Further, the output side of the acceleration sensor 51 is connected to one input terminal of a voltage follower 60. Further, the output terminal and the other input terminal of the voltage follower 60 are connected.

In the above acceleration detecting device, the following relation is established: Output voltage $V_{OUT}$=Input voltage to the amplifier $V_i$=Generated voltage $V_p$ in the acceleration sensor. The output of the voltage follower 60 converts the output to a sufficiently low impedance.

However, in an operational amplifier and FET constituting the above voltage follower 60, for example, because there is bias current $i_B$ flowing out of the input terminal, the above-mentioned leak resistor R is required. That is, unless the leak resistor R is present, the capacitance of the acceleration sensor 51 continues to be charged and the voltage becomes saturated. Accordingly, the leak resistor R is required.

But the leak resistor R causes the electric charge generated at the piezoelectric plates 52, 53 to leak. That is, when the acceleration is slowly changed, or when the acceleration is not changed, the electric charge completely leaks before any voltage $V_p$ is generated. Therefore, no predetermined detection voltage can be obtained. This is expressed by a frequency characteristic as shown in FIG. 7.

FIG. 7 shows the relation between the frequency of acting acceleration at the time when the above-mentioned acceleration detecting circuit is used and the voltage $V_i$ to be input to the voltage follower 60.

In FIG. 7, $f_c$ represents a cutoff frequency. Here, the cutoff frequency $f_c$ is given by $$f_c=1/(2\pi RC_p)$$

Therefore, in order to measure acceleration at lower frequencies than the above cutoff frequency $f_c$, resistance R and/or capacitance $C_p$ is required to increase. But if resistance R is increased, the offset voltage of the voltage follower 60 increases and in order to reduce the offset voltage an operational amplifier having small bias current is required to be used as a voltage follower, which results in high cost.

Further, even if an operational amplifier of low bias voltage is available, when, for example, a high leak resistance R exceeding 10 MΩ is connected, advanced measures for humidity resistance are required including for the printed-circuit board to which the leak resistor R is connected. As a result, there are various restrictions even if the resistance of the leak resistor R were to be increased.

On the other hand, the capacitance $C_p$ is determined by the configuration of the piezoelectric plates 52, 53 and the dielectric constant $\epsilon$ of the material constituting the piezoelectric plates 52, 53. That is, the capacitance $C_p$ is given by $$C_p=\epsilon W \cdot L/T$$

where W, L, and T represent the width, length, and thickness of the piezoelectric plates 52, 53, respectively.

But when the thickness of T is made thinner, the mechanical strength is lowered, and accordingly there is a limit to which the thickness of T may be thinned. Therefore, up to now, in order to increase the capacitance $C_p$, the width W and/or length L was required to be increased. However, such a method brings about acceleration sensors 51 of larger external dimensions and higher cost.

Also, when a charge amplifier is used, as shown in FIG. 8, leak resistance R and capacitance C are required to be connected in parallel with the operational amplifier 61. And when acceleration at low frequencies was measured, it was required to increase the above leak resistance R and capacitance C. But, since the output of the amplifier $V_{OUT}$ is given by $V_{OUT}=Q_p/C$, the capacitance C was not able to be increased over a certain level in order to obtain a larger output voltage. Here $Q_p$ represents electric charge.

Another known acceleration sensor is an acceleration sensor 71 which, as shown in FIG. 9, includes two piezoelectric elements connected in parallel. More specifically, in the acceleration sensor 71, two piezoelectric plates 72, 73, which have been polarized in the thickness direction, are joined with adhesive. On the upper surface of the piezoelectric plate 72 a signal output electrode 74 is formed, and on the lower surface of the piezoelectric plate 73, a signal output electrode 75 is formed. On the joining surface of the piezoelectric plates 72, 73 an intermediate electrode 76 is formed.

Here, conductive patterns 78, 79 are formed on the substrate 77 on which the acceleration sensor 71 is to be mounted. To the conductive pattern 78, the signal output electrode 75 is connected. In like manner, the signal output electrode 74 is connected to the conductive pattern 78 via a lead wire 80. The intermediate electrode 76 is led out from between the piezoelectric plates 72, 73, and connected to the conductive pattern 79 via a lead wire 81.

The signal output electrode 75 is joined and connected to the conductive pattern 78 in the vicinity of one end of the substrate. In this manner the acceleration sensor 71 is supported like a cantilever.

In the above acceleration sensor 71, as the piezoelectric elements using piezoelectric plates 72, 73 are connected in parallel, the capacitance is able to be increased. However, because the acceleration sensor 71 is supported like a cantilever, there is a problem, as explained above, in that the electrical connection needed to obtain a signal from the signal output electrodes 74, 75 and intermediate electrode 76 becomes very complicated and costly.

Further, in the above acceleration sensor 71, by adding more capacitors, the capacitance is able to be increased. Such a circuit is shown in FIG. 10.

As shown in FIG. 10, a capacitor $C_a$ is connected in parallel with the acceleration sensor 71. At a latter stage of the acceleration sensor 71 and capacitance $C_a$, a leak resistor R and voltage follower 60 are connected in the same way as shown in FIG. 6. Here, when the capacitance of the capacitor $C_a$ is set at three times as large as that of the capacitance $C_p$ of the acceleration sensor 71, the cutoff frequency becomes $f_c=1/(2\pi R \cdot 4C_p)$ to reduce the cutoff frequency $f_c$ to one fourth. However, in this case, the generated voltage $V_i$ becomes the following:

$$V_i=Q_p/(4C_p)=V_0 \cdot C_p/(4 \cdot C_p)=V_0/4.$$

That is, the generated voltage $V_i$ is reduced to one fourth.

As described above, the conventional acceleration sensor 51 of the connected-in-series type is comprised of the joined piezoelectric plates 52, 53. And, although acceleration sensors having improved sensitivity and of small size were able to be devised because the piezoelectric plates 52, 53 are supported in the vicinity of both ends of the plates, there was a problem that the acceleration sensors had difficulty detecting acceleration at low frequencies and, when it is attempted to detect acceleration at low frequencies, acceleration sensors of small size cannot be economically devised.

Further, in the conventional acceleration sensor 71 of the connected-in-parallel type, as the sensor is supported like a cantilever, there were problems of low resistance to mechanical shocks, complicated electrical connection for getting signals, and high cost. In addition, when it was attempted to increase the capacitance by connecting an external capacitor $C_a$ and to detect acceleration at low frequencies, there was a problem that the generated voltage $V_i$ was decreased.

SUMMARY OF THE INVENTION

It is an object of the present invention to provide an acceleration sensor and acceleration detecting device which solve the above-mentioned drawbacks of the conventional art, and enable the acceleration sensor and the acceleration detecting device to be made small-sized, to have increased capacitance, to be able to detect acceleration at low frequencies with high precision, and to have high charge sensitivity.

According to one aspect of the present invention, an acceleration sensor comprises a strip-like piezoelectric member having first and second end portions, first and second signal output electrodes formed on a pair of main surfaces facing each other of the piezoelectric member, an intermediate electrode formed so as to face the first and second signal output electrodes at the intermediate position between the pair of main surfaces of the piezoelectric member, and first and second supporting members attached to the first and second main surfaces of the piezoelectric member respectively so as to sandwich and support the piezoelectric member at both ends, wherein the piezoelectric member is polarized at the central area in the thickness direction thereof, and the first and second signal output electrodes are led to the first end portion, and the intermediate electrode is led to the second end portion.

In a second aspect of the present invention, polarization is provided in the thickness direction to the central area of the piezoelectric member, and both external areas between which the central area is located in the length direction of the piezoelectric member are polarized in the thickness direction in the opposite direction from the polarization direction of the central area.

In a third aspect of the present invention, the piezoelectric member is made in a strip-like shape and includes a pair of piezoelectric ceramic plates. A signal output electrode and an intermediate electrode are formed on the main surfaces of each of the plates respectively, and electrodes on the plates are joined and connected so as to face each other and to form the intermediate electrode.

According to a fourth aspect of the present invention, the piezoelectric member and the first and second supporting members are joined and connected to form a main body of the acceleration sensor, and first and second external electrodes are formed on the first and second end surfaces on the sides of the first and second end portions of the piezoelectric member of the main body of sensor.

According to a fifth aspect of the present invention, an acceleration detecting device comprises the acceleration sensor as described above, a leak resistor electrically connected in parallel to the acceleration sensor, and an amplifier to amplify the voltage across the leak resistor.

According to a sixth aspect of the present invention, an acceleration detecting device comprises the acceleration sensor as described above, and a charge amplifier connected to the output of the acceleration sensor.

Other features and advantages of the present invention will become apparent from the following description of the invention which refers to the accompanying drawings.

DETAILED DESCRIPTION OF EMBODIMENTS OF THE INVENTION

Figure 1:
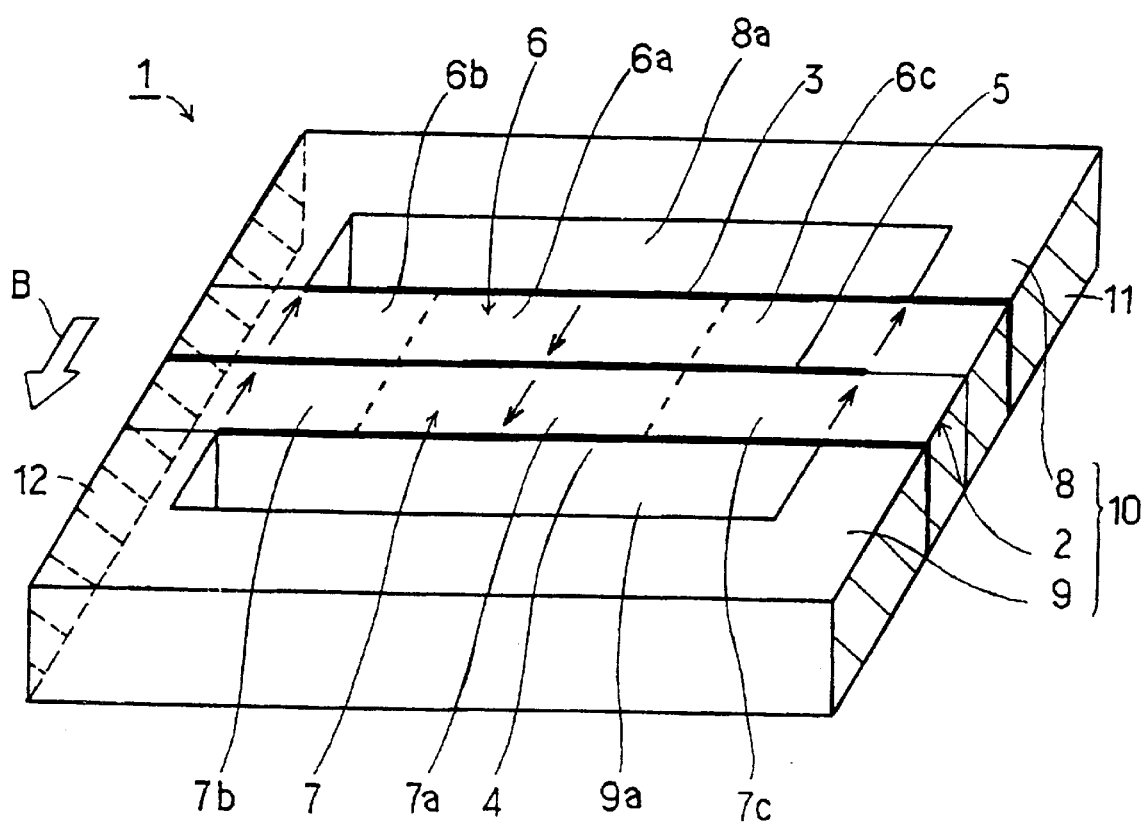
FIG. 1 is a perspective view of an acceleration sensor according to a preferred embodiment of the present invention.

FIG. 1 is a perspective view to explain an acceleration sensor according to a preferred embodiment of the present invention.

The acceleration sensor 1 is comprised of a strip-like piezoelectric member 2. The piezoelectric member 2 is made up of piezoelectric ceramics, such as, for example, lead zirconate titanate system ceramics.

On one main surface of the piezoelectric member 2, a first signal output electrode 3 is formed. On the main surface opposite to and facing the main surface on which the first signal output electrode 3 is formed, a second signal output electrode 4 is formed. Further, in the intermediate position in the thickness direction of the piezoelectric member 2 (the thickness direction is the direction extending between the main surfaces), an intermediate electrode 5 is formed so as to face the first and second signal output electrodes 3, 4.

The first signal output electrode 3 and the intermediate electrode 5 face each other in the thickness direction via piezoelectric member 6, and the intermediate electrode 5 and second signal output electrode 4 face each other in the thickness direction via piezoelectric member 7.

The piezoelectric members 6, 7 are comprised of fired piezoelectric ceramic plates, which are joined by adhesion via the intermediate electrode 5, that is, they are joined so as to face each other. Each of the piezoelectric ceramic plates, on surfaces facing each other, may have electrodes thereon which are then joined to form the intermediate electrode 5.

In the piezoelectric member 6, the central area 6a is polarized in the thickness direction, as shown by the arrow. On the other hand, the external areas 6b, 6c on both sides of the central area 6a of the piezoelectric member 6 are polarized in the opposite direction to that of the central area 6a in the thickness direction, as shown by the arrows.

In the piezoelectric member 7, as shown by the arrows, the central area 7a is polarized in the same direction as that of the central area 6a of the piezoelectric member 6, and the external areas 7b, 7c are polarized in the same direction as the piezoelectric member 6b, 6c.

Further, the boundaries between the central areas 6a, 7a and external areas 6b, 6c, 7b, 7c are shown by broken lines in FIG. 1.

In the present embodiment, the signal output electrodes 3, 4 extend to a first end portion of the piezoelectric member 2, and the intermediate electrode 5 extends to a second end portion as the end portion located opposite to the first end portion of the piezoelectric member 2. Therefore, one piezoelectric element comprises the piezoelectric member 6, the signal output electrode 3, and the intermediate electrode 5, and another piezoelectric element comprises the piezoelectric member 7, the intermediate electrode 5, and the signal output electrode 4. The piezoelectric elements thus constituted are connected in parallel.

Further, in order to support the piezoelectric member 2 in the vicinity of both ends, a first supporting member 8 is fixed to the main surface on the side where the signal output electrode 3 of the piezoelectric member 2 is formed. In the same way, a second supporting member 9 is fixed to the main surface on the side where the signal output electrode 4 of the piezoelectric member 2 is formed.

The supporting members 8, 9 are fixed to the main surfaces of the piezoelectric member 2 in the vicinity of both ends of the piezoelectric member 2. The supporting members 8, 9 have concave or hollow portions 8a, 9a, respectively. The concave portions 8a, 9a are provided to allow portions in the piezoelectric member 2 located between both ends supported by supporting members to be displaced when acceleration acts in the direction of an arrow B.

The material constituting the above supporting members 8, 9 is not particularly limited, and the members may be constructed by, for example, an appropriate material such as insulator ceramics, synthetic resin, etc.

Further, a main body of sensor 10 is constructed by fixing the supporting members 8, 9 to the piezoelectric member 2. On a first end surface of this main body of sensor 10, a first external electrode 11 is formed, and on a second end surface facing the first end surface a second external electrode 12 is formed. That is, on the side of the first end portion of the piezoelectric member 2 the first end surface is disposed and, accordingly, the signal output electrodes 3, 4 are electrically connected to the external electrode 11. Similarly, the second end surface of the main body of sensor 10 is located on the side of the second end portion of the piezoelectric member 2 and the external electrode 12 is electrically connected to the intermediate electrode 5.

In the acceleration sensor 1, when acceleration acts in the direction of the arrow B, that is, in the thickness direction of the piezoelectric member 2, portions in the piezoelectric member 2 located between both ends thereof supported by supporting members 8, 9 are allowed to be displaced, and the electric charge caused by the displacement is extracted between the signal output electrodes 3, 4 and the intermediate electrode 5. In this case, because polarization treatment is provided to the central areas 6a, 7a and the external areas 6b, 6c, 7b, 7c in the opposite direction to each other, due to the electric charge caused by the bent displacement of the piezoelectric member 2, a higher voltage is generated.

Figure 4:
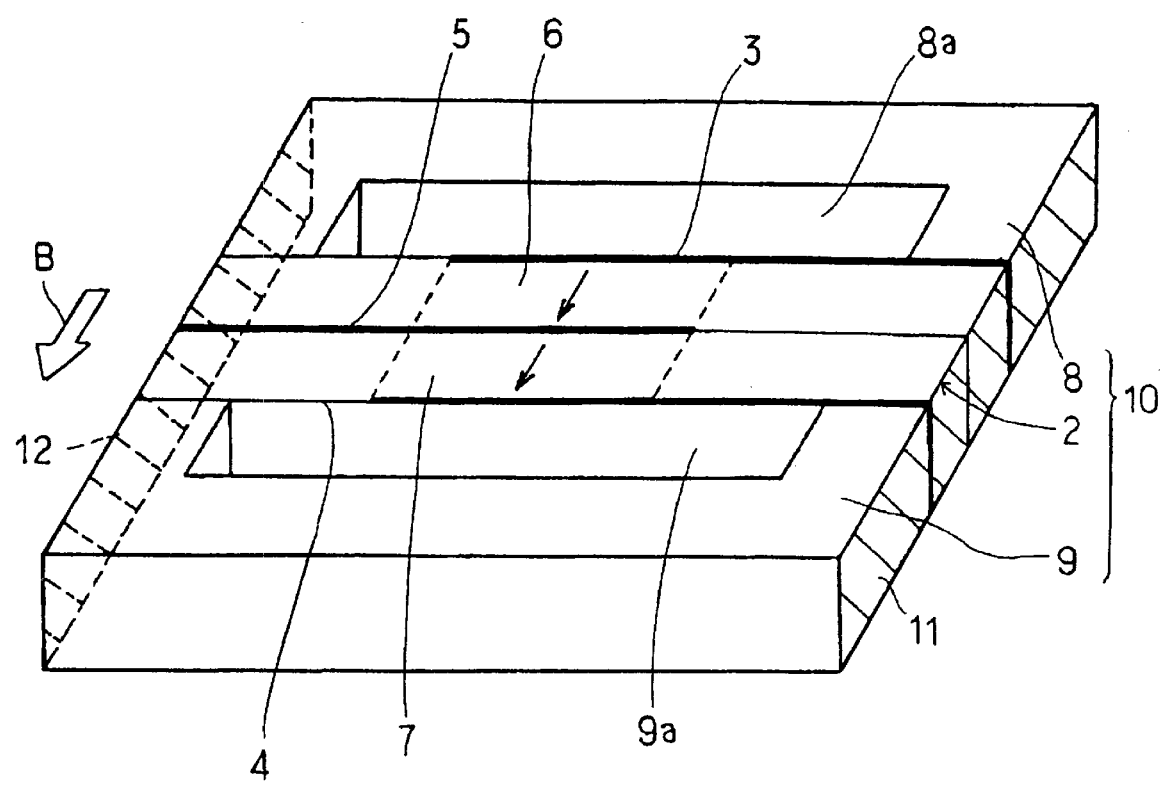
FIG. 4 is a perspective view showing a modification of the acceleration sensor shown in FIG. 1.

However, as in a modified example shown in a perspective view of FIG. 4, polarization may not necessarily be provided to the piezoelectric member 6, 7 as described above, and polarization may be provided to all the areas of the piezoelectric member 6, 7 in the same direction in the thickness direction. But it is desirable to provide polarization as in the embodiment shown in FIG. 1, because the detection sensitivity can be increased as described above.

The acceleration sensor 1 of the present embodiment is able to effectively detect acceleration at lower frequencies compared with the conventional acceleration sensor 51. When acceleration acts in the direction of the arrow B, the generated voltage and capacitance between the signal output electrode 3 and intermediate electrode 5, between the intermediate electrode 5 and signal output electrode 4, and between the first and second external electrodes 11, 12 of the acceleration sensor 1 are represented by $V_1$, $V_2$, $V_p$, $C_1$, $C_2$, and $C_p$, respectively.

TABLE 2

| Between electrodes | Generated voltage | Capacitance |
|---|---|---|
| Signal output electrode 3- Intermediate electrode 5 | $V_1$ | $C_1$ |
| Intermediate electrode 5- Signal output electrode 4 | $V_2$ | $C_2$ |
| External electrode 11- External electrode 12 | $V_p$ | $C_p$ |

Now, suppose the layers of piezoelectric member 6, 7 has the same dimension, the following relation is established. That is, $$V_1 = V_2, \text{ and } C_1 = C_2$$

Therefore, $V_1$ and $V_2$ may be replaced by $V_0$, and $C_1$ and $C_2$ may be replaced by $C_0$. Accordingly, because the piezoelectric elements of the acceleration sensor are connected in parallel, the generated voltage $V_p$ in the acceleration sensor 1 is $$V_p = V_0$$

and the capacitance $C_p$ is $$C_p = 2C_0$$

Figure 5:
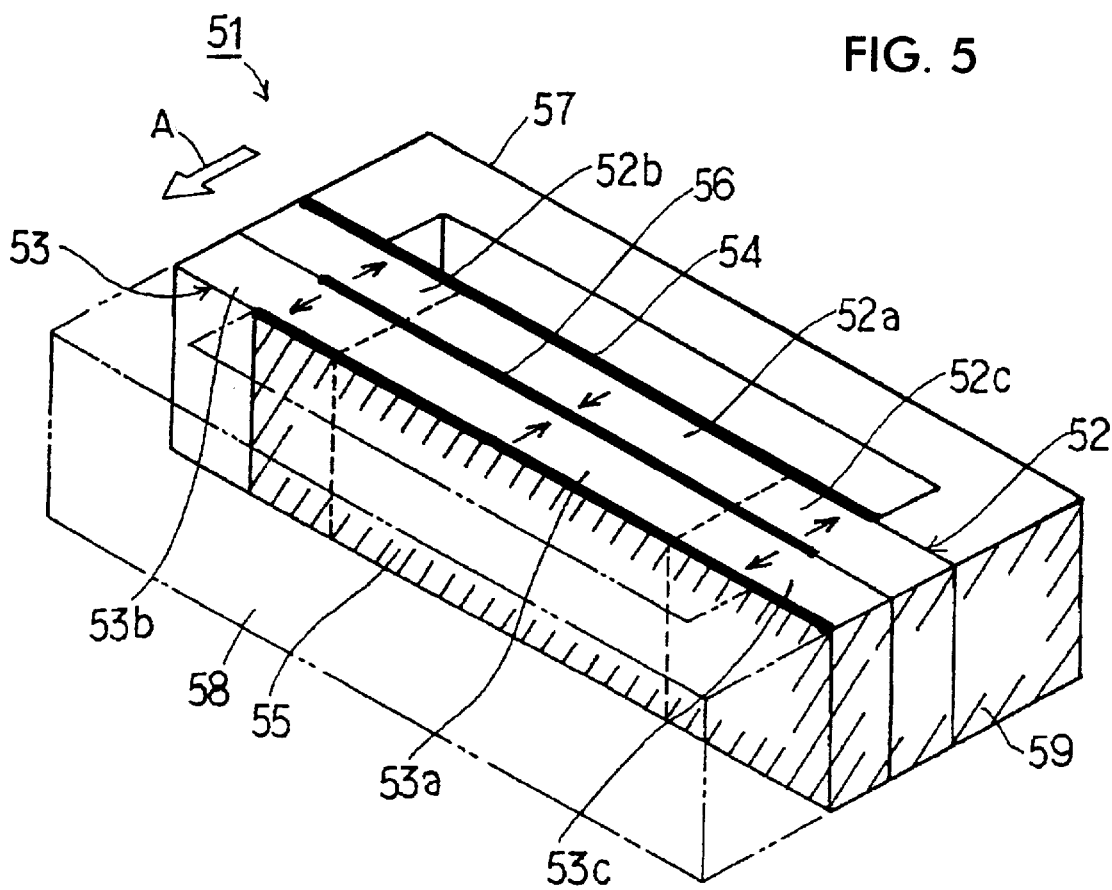
FIG. 5 is a perspective view showing one example of a conventional acceleration sensor.
Figure 6:
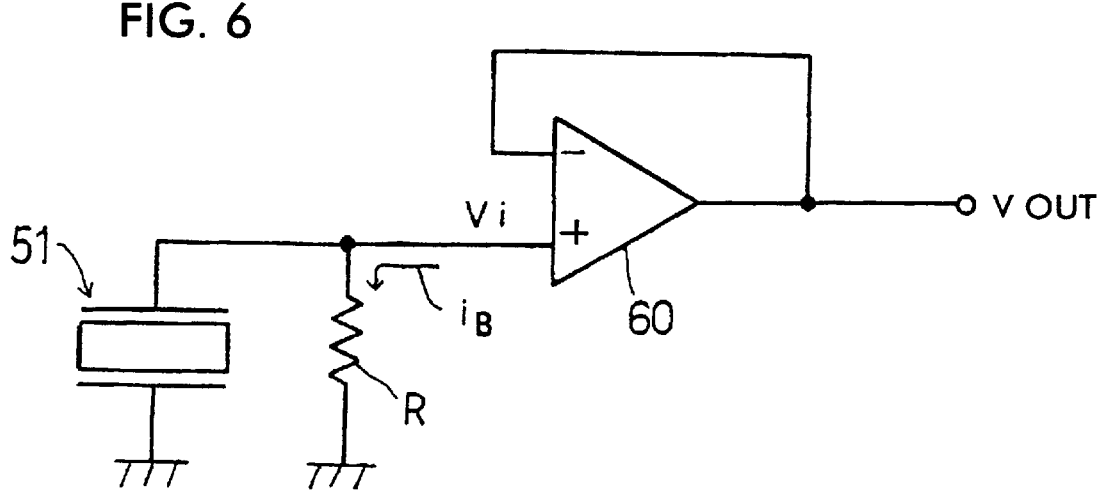
FIG. 6 is a circuit diagram of a conventional acceleration detecting device comprising a conventional acceleration sensor with an amplifier connected thereto.
Figure 7:
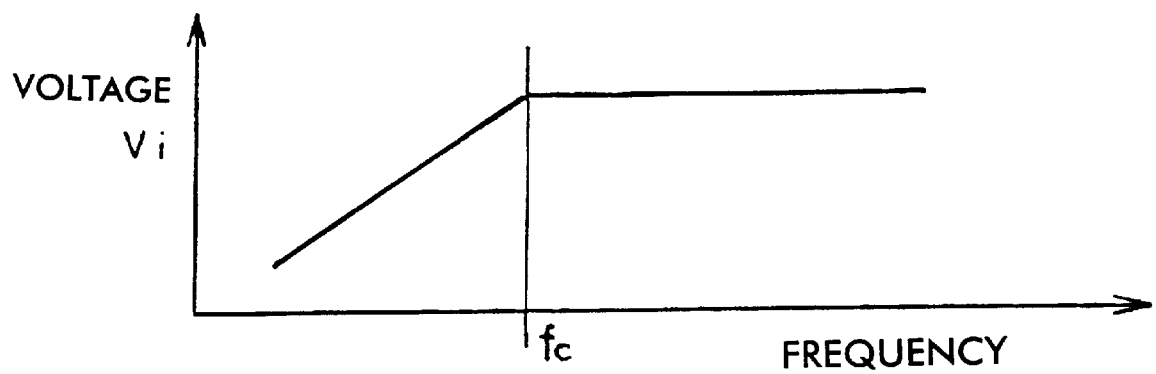
FIG. 7 is a diagram to explain the relation between frequencies of acting acceleration and input voltage to the amplifier in a conventional acceleration detecting device.
Figure 8:
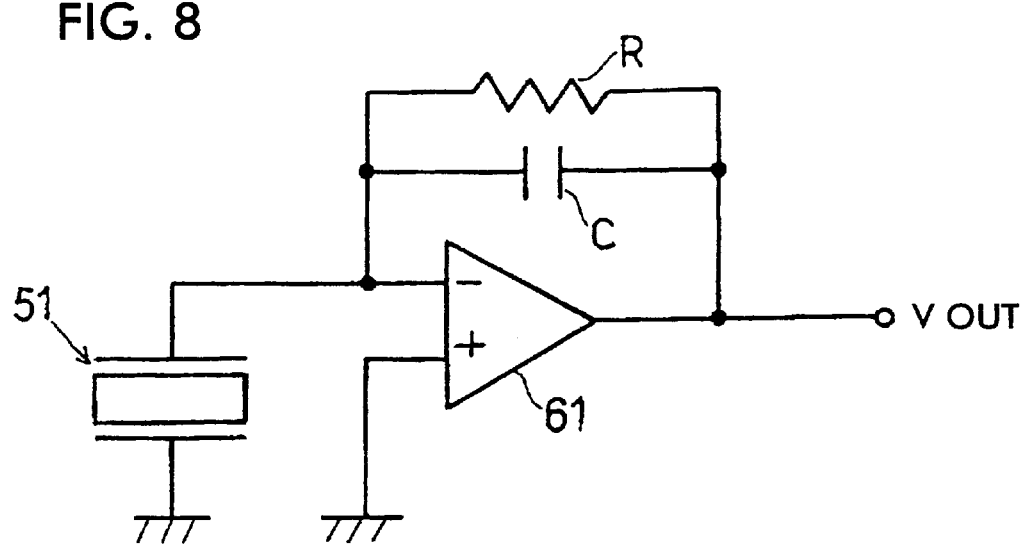
FIG. 8 is a circuit diagram of an acceleration detecting device comprising a conventional acceleration sensor with a charge amplifier connected thereto.
Figure 9:
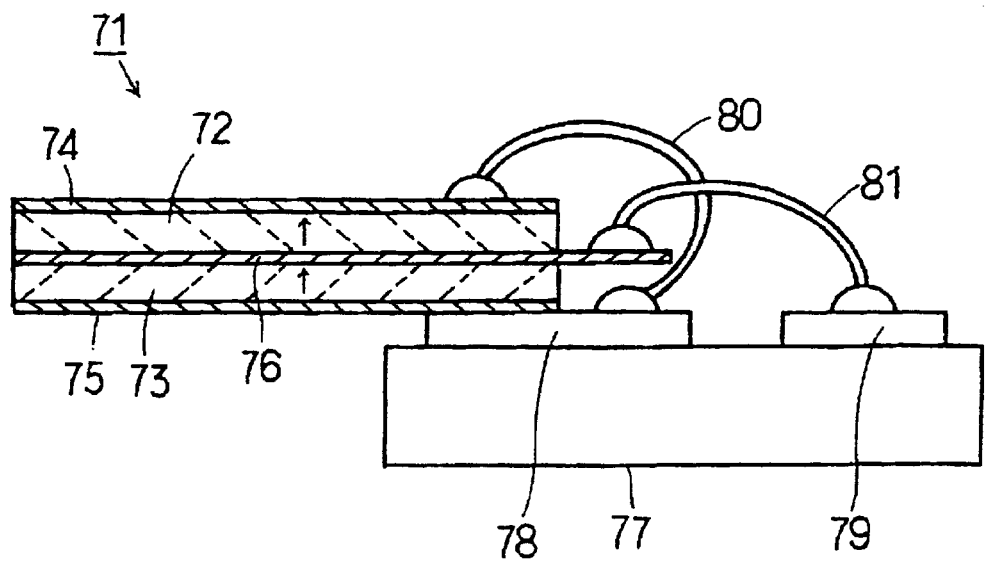
FIG. 9 a surface sectional view to explain a conventional acceleration sensor of parallel connection type.

Therefore, compared with the conventional acceleration sensor 51, shown in FIG. 5, the generated voltage is one half, but the capacitance is increased to four times. Further, the generated electric charge $Q_p$ becomes $$Q_p = 2 \cdot V_0 \cdot C_0$$

This is twice as large as that of the conventional acceleration sensor 51. That is, the electric charge sensitivity is increased to be twice as large.

Therefore, by using an acceleration sensor 1 according to the present invention, it is possible to have the capacitance increased and the electric charge sensitivity improved without making the external dimension larger compared with the conventional acceleration sensor 51. Particularly, since the capacitance is made four times as large as that of the conventional acceleration sensor 51, the cutoff frequency is able to be reduced to one fourth, and it possible to detect acceleration of low frequencies effectively.

Further, in the acceleration sensor 1, as described above, the main body of sensor 10 has the supporting members 8, 9 attached in the vicinity of both ends of the piezoelectric member 2, and the external electrodes 11, 12 are formed on the first and second end surfaces facing each other of the main body of sensor 10. Therefore, the configuration of leadout electrodes from the signal output electrodes 3, 4 and intermediate electrode 5 is able to be simplified.

Figure 10:
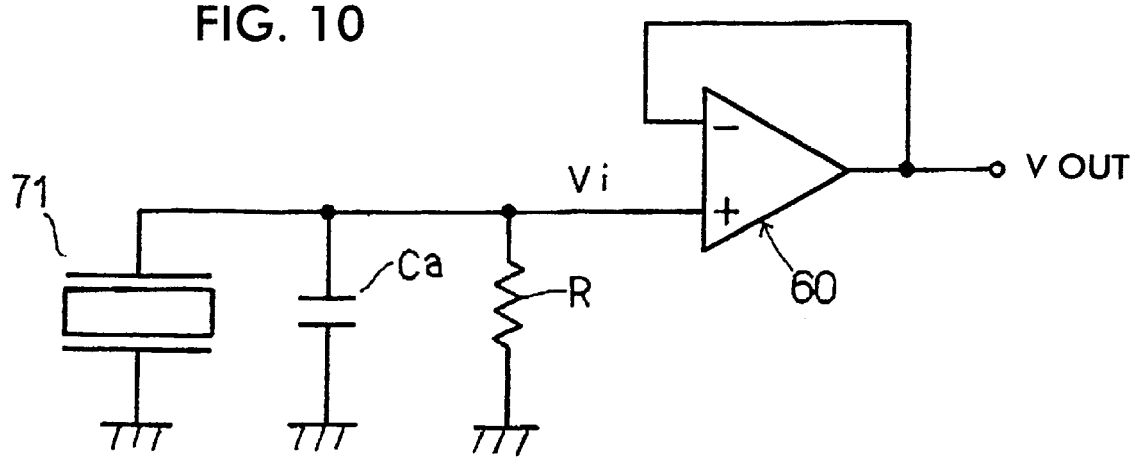
FIG. 10 is a circuit diagram of an acceleration detecting device comprising of a conventional acceleration sensor with a resistor connected in parallel thereto so as to measure acceleration in low frequencies.

In the acceleration sensor 1, although the generated voltage $V_p$ is reduced to be a half of that in the conventional acceleration sensor 51, as described above, the generated voltage $V_p$ becomes doubled compared with the conventional example in which the capacitance is increased by adding a capacitor $C_a$ as shown in FIG. 10. That is, it is understood that the generated voltage $V_p$ becomes doubled compared with the conventional example with addition of a capacitor $C_a$ in which acceleration at low frequencies is measured.

Therefore, when the acceleration sensors of the same size are constructed, it is possible to detect acceleration at lower frequencies effectively compared with the conventional example, and it is clear that acceleration at low frequencies is able to be detected as described above without any extra external capacitor.

Figure 2:
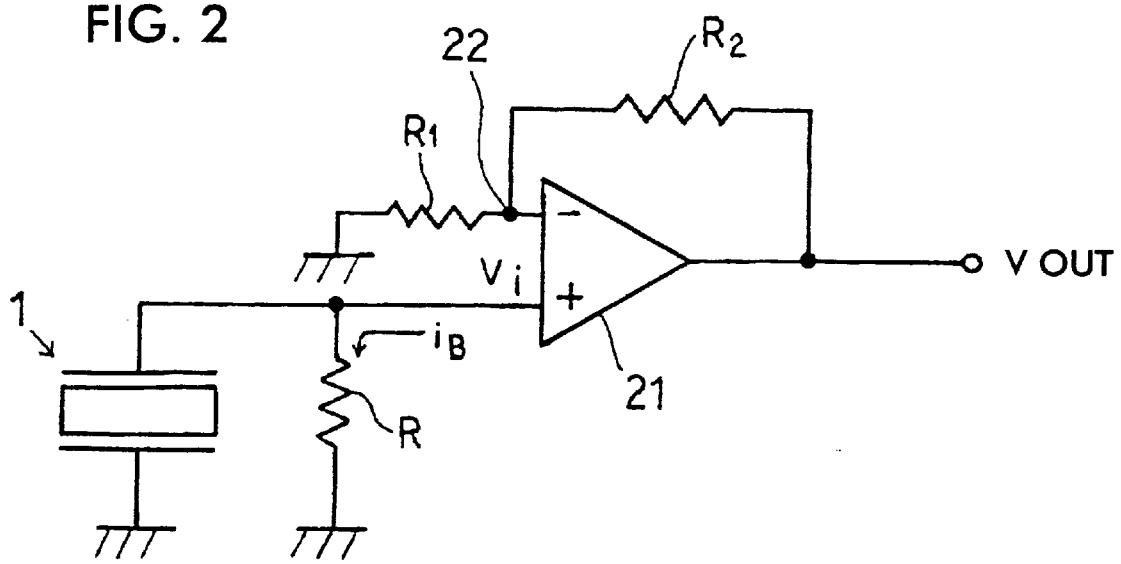
FIG. 2 shows a circuit configuration of an acceleration detecting device using the acceleration sensor of the preferred embodiment shown in FIG. 1.

FIG. 2 shows a circuit diagram of one example of an acceleration detecting device using the acceleration sensor 1.

In the acceleration detecting device of the present embodiment, a leak resistor R is connected in parallel to the acceleration sensor 1. That is, one external electrode of the acceleration sensor 1 is connected to the ground potential, and one end of the leak resistor R is also connected to the ground potential. Further, the other end of the resistor R is connected to the other external electrode of the acceleration sensor 1, that is, the electrode on the output side.

The output sides of the acceleration sensor 1 and resistor $R_1$ are connected in common as described above, and connected to one input terminal of an operational amplifier 21. A resistor $R_1$ is connected between the other input terminal of the operational amplifier 21 and the ground potential. The connection point 22 is located between the resistor $R_1$ and the other input terminal of the operational amplifier 21. A resistor $R_2$ is connected between the connection point 22 and the output of the operational amplifier 21. In this way, a positive feedback amplifier is arranged.

In the acceleration detecting device of the present embodiment, acceleration at low frequencies is able to be detected effectively, as described below.

In the above circuit configuration, suppose $(R_1+R_2)/R_1=K$, the output voltage $V_{OUT}$ of the acceleration detecting device becomes $$V_{OUT}=V_p \cdot K=V_0 \cdot K$$

Further, the cutoff frequency $f_c$ becomes $$f_c=1/(2\pi C_p \cdot R)=1/\{2(2\pi C_0 \cdot R)\}=1/(4\pi \cdot C_0 \cdot R)$$

Further, here a voltage follower of K=1 may be used.

Further, the offset voltage $V_{off}$ at the output terminal of the operational amplifier 21 due to bias current $i_B$ becomes $$V_{off}=R \cdot i_B \cdot K$$

Therefore, the amplifier factor K and resistance value of the leak resistor $R_1$ mutually affect output voltage $V_{OUT}$, cutoff frequency $f_c$ f and offset voltage $V_{off}$. For example, when the resistance value of the leak resistor R, is increased in order to increase the amplifier factor K or decrease the cutoff frequency $f_c$, the offset voltage $V_{off}$ is increased. Accordingly, circuit constants are generally set so as to attach importance to more essential characteristics and realize total consistency.

Next, the above acceleration detecting device is compared to the conventional acceleration detecting device shown in FIG. 10. Here, K and resistance of the resistor R are set so that the output voltage and offset frequency become the same as those of the above embodiment, and then the offset voltage $V_{off}$ is determined in the conventional example.

In the conventional example, K is able to be reduced to one half because of $V_{OUT}=V_p \cdot K=2V_0 \cdot K$. Further, because of cutoff frequency $f_c=1/(2\pi \cdot C_p \cdot R)=1/\{2\pi \cdot C_0/2) \cdot R\}=1/(\pi \cdot C_0 \cdot R)$, in order to obtain the same cutoff frequency fc−1/(4π·$C_0$·R), resistance is required to be increased four times as large. Therefore, the offset voltage becomes $$V_{off}=(4R \cdot i_B \cdot K/2)=2(R \cdot i_B \cdot K)$$

Accordingly, compared with the above embodiment, the offset voltage of the conventional example $V_{off}$ is twice as great.

Further, in the above comparison, although the offset voltage $V_{off}$ has been considered, this is only one example. Even if, the other two constants are preferentially set in the conventional example, one remaining constant becomes worse.

Figure 3:
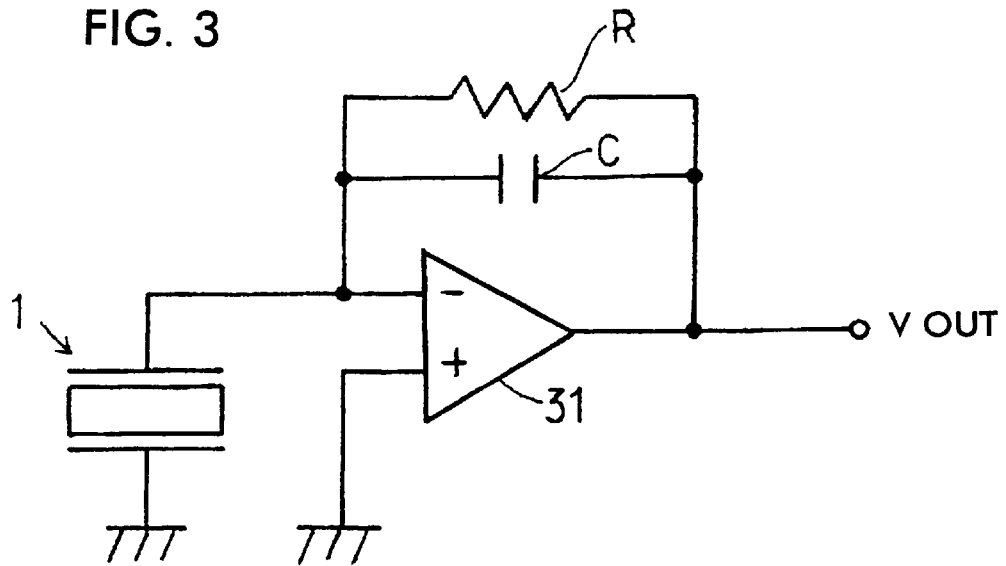
FIG. 3 is a circuit diagram to explain an acceleration detecting device having a charge amplifier connected to the output stage of the acceleration sensor shown in FIG. 1.

Further, in FIG. 2 the acceleration detecting device is constructed using an amplifier to amplify the voltage across the leak resistor R but, as shown in FIG. 3, the acceleration detecting device may be constructed using an electric charge amplifier. Here, the output of the acceleration sensor 1 is connected to one input terminal of the operational amplifier 31 as an electric charge amplifier. The other input terminal of the operational amplifier 31 is connected to the ground potential. Further, a resistor R and a capacitor C are connected in parallel between one input terminal of the operational amplifier 31, that is, the input terminal on the side connected to the acceleration sensor 1 and the output terminal of the operational amplifier 31.

In the acceleration detecting device shown in FIG. 3, since the generated electric charge by the acceleration sensor 1 is made twice as much as that of the conventional example, the output voltage of the electric charge amplifier is doubled.

According to the present invention, on a pair of main surfaces facing each other a strip-like piezoelectric member comprising first and second signal output electrodes are formed; at the intermediate position in the direction connecting the pair of main surfaces of the piezoelectric member, an intermediate electrode is formed so as to face the first and second signal output electrodes; the piezoelectric member is supported at both ends of the piezoelectric member by first and second supporting members; the first and second signal output electrodes extends to a first end portion of the piezoelectric member; and an intermediate electrode extends to a second end portion of the piezoelectric member. Therefore, when acceleration acts on the piezoelectric member, the voltage caused by the generated electric charge is extracted between the first and second signal output electrodes and the intermediate electrode. Since the piezoelectric members on both sides of the intermediate electrode are connected in parallel, the capacitance of the acceleration sensor increases. Because of this, acceleration at low frequencies is able to be detected with high precision without preventing the acceleration sensor from being made small-sized, and at the same time the charge sensitivity is not substantially lowered.

Further, as the first and second signal output electrodes extend to the first end portion of the piezoelectric member and the intermediate electrode extends to the second end portion of the piezoelectric member, electrical connection to the external circuit is easy.

In the present invention, since polarization is provided to the central area of a piezoelectric member in the thickness direction and both external areas between which the central area is located in the length direction of the piezoelectric member are polarized in the opposite direction from that of the central area, the voltage due to the electric charge generated by acting of acceleration is able to be effectively extracted to measure acceleration at low frequencies with high precision.

In the present invention, a piezoelectric member is made in a strip-like shape and comprises a pair of piezoelectric ceramic plates. A signal output electrode and an electrode are formed on the main surfaces of each of the plates respectively and the intermediate electrodes themselves are joined and connected so as to face each other and to form the intermediate electrode. The fired piezoelectric ceramic plates are bonded via conductive adhesive or a thin insulating adhesive to bring about electrical conduction. Therefore, the above piezoelectric member according to the present invention is able to be easily constructed.

In the present invention, a main body of an acceleration sensor comprises a piezoelectric member and first and second supporting members joined and connected thereto. Since first and second external electrodes are formed on the first and second end surfaces on the sides of first and second end portions of the piezoelectric member of the main body of the sensor, the output voltage at the time when acceleration acts is able to be easily taken out from the first and second external electrodes, and further electrical connection to the external circuit is easily achieved.

In an acceleration detecting device according to the present invention, since a leak resistor electrically connected in parallel to the acceleration sensor, and an amplifier to amplify the voltage across the leak resistor are provided, acceleration at low frequencies is able to be measured with high precision. By adjusting resistance of the leak resistor and the amplification factor of the amplifier, the cutoff frequency can be adjusted to a desired value.

Further, in accordance with the invention, a charge amplifier may be connected at the output stage of a acceleration sensor to obtain higher output voltage.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An acceleration sensor comprising:
   a strip-like piezoelectric member having first and second end portions;
   first and second signal output electrodes formed on a pair of main surfaces facing each other of the piezoelectric member;
   an intermediate electrode formed at the intermediate position between the pair of main surfaces of the piezoelectric member so as to face the first and second signal output electrodes; and
   first and second supporting members attached to the first and second main surfaces of the piezoelectric member so as to sandwich and support the piezoelectric member at both ends of the piezoelectric member;
   wherein the piezoelectric member is polarized in the thickness direction at the central area of the piezoelectric member;
   the first and second signal output electrodes extend to the first end portion of the piezoelectric member; and
   the intermediate electrode extends to the second end portion of the piezoelectric member.

2. An acceleration sensor according to claim 1, wherein the piezoelectric member has external areas between a central area in the length direction of the piezoelectric member and wherein the external areas and the central areas are polarized in a thickness direction of the piezoelectric member, the external areas being polarized in an opposite direction from the polarization direction of the central area.

3. An acceleration sensor according to claim 1 or 2, wherein the piezoelectric member has a strip-like shape and comprises a pair of piezoelectric ceramic plates, the signal output electrodes and additional electrodes being formed on main surfaces of each of the plates, respectively, and the additional electrodes of each plate are joined and connected so as to face each other and form the intermediate electrode.

4. An acceleration sensor as claimed in claim 1 or 2, wherein the piezoelectric member and the first and second supporting members form a main body, and first and second external electrodes are formed on first and second end surfaces on the first and second end portions of the piezoelectric member of the main body.

5. An acceleration sensor according to claim 4, wherein the first and second support members have respective hollow portions adjacent to the first and second main surfaces of the piezoelectric member, respectively.

6. An acceleration sensor according to claim 3, wherein the piezoelectric member and the first and second supporting members form a main body, and first and second external electrodes are formed on first and second end surfaces on the first and second end portions of the piezoelectric member of the main body.

7. An acceleration sensor according to claim 6, wherein the first and second support members have respective hollow portions adjacent to the first and second main surfaces of the piezoelectric member, respectively.

8. An acceleration detecting device, comprising:
   a strip-like piezoelectric member having first and second end portions;
   first and second signal output electrodes formed on a pair of main surfaces facing each other of the piezoelectric member;
   an intermediate electrode formed at the intermediate position between the pair of main surfaces of the piezoelectric member so as to face the first and second signal output electrodes;
   first and second supporting members attached to the first and second main surfaces of the piezoelectric member so as to sandwich and support the piezoelectric member at both ends of the piezoelectric member;
   a leak resistor electrically connected in parallel to the acceleration sensor; and
   an amplifier to amplify the voltage across the leak resistor;
   wherein the piezoelectric member is polarized in a thickness direction at the central area of the piezoelectric member;
   the first and second signal output electrodes extend to the first end portion of the piezoelectric member;
   the intermediate electrode extends to the second end portion of the piezoelectric member.

9. An acceleration detecting device according to claim 8, further comprising,
   a charge amplifier connected to the output of the acceleration sensor.

10. An acceleration detecting device according to claim 8, wherein the piezoelectric member has external areas between a central area in the length direction of the piezoelectric member and wherein the external areas and the central areas are polarized in a thickness direction of the piezoelectric member, the external areas being polarized in an opposite direction from the polarization direction of the central area.

11. An acceleration detecting device according to claims 8, 9 or 10, wherein the piezoelectric member has a strip-like shape and comprises a pair of piezoelectric ceramic plates, the signal output electrodes and additional electrodes being formed on the main surfaces of each of the plates, respectively, and the additional electrodes of each plate are joined and connected so as to face each other and form the intermediate electrode.

12. An acceleration detecting device as claimed in claim 11, wherein the piezoelectric member and the first and second supporting members form a main body, and first and second external electrodes are formed on first and second end surfaces on the first and second end portions of the piezoelectric member of the main body.

13. An acceleration detecting device according to claim 12, wherein one of the pair of the piezoelectric ceramic plates is connected in parallel to the other thereof.

14. An acceleration detecting device according to claim 12, wherein the polarization direction of the central area of one of the piezoelectric ceramic plates is the same as that of central area of the other thereof, and the polarization direction of the both external areas of one of the plates is the same as that of both external areas of the other plate.

15. An acceleration detecting device according to claim 14, wherein the first and second support members have respective hollow portions adjacent to the first and second main surfaces of the piezoelectric members, respectively.

* * * * *